United States Patent
Schneider et al.

(10) Patent No.: US 9,689,394 B2
(45) Date of Patent: Jun. 27, 2017

(54) SWITCHABLE MECHANICAL COOLANT PUMP

(75) Inventors: Jean-Christophe Schneider, Valmestroff (FR); Laurent Finidori, Bertrange (FR); Albert Genster, Marl (DE); Thomas Schwander, Neuss (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 602 days.

(21) Appl. No.: 14/344,060

(22) PCT Filed: Sep. 11, 2012

(86) PCT No.: PCT/EP2012/067740
§ 371 (c)(1),
(2), (4) Date: Sep. 8, 2014

(87) PCT Pub. No.: WO2013/037775
PCT Pub. Date: Mar. 21, 2013

(65) Prior Publication Data
US 2014/0377090 A1    Dec. 25, 2014

(30) Foreign Application Priority Data
Sep. 13, 2011 (EP) ..................................... 11007433

(51) Int. Cl.
*F04D 13/02* (2006.01)
*F16D 27/112* (2006.01)
*F16D 23/12* (2006.01)

(52) U.S. Cl.
CPC .......... *F04D 13/021* (2013.01); *F16D 27/112* (2013.01); *F16D 2023/123* (2013.01)

(58) Field of Classification Search
CPC .................................................... F04D 13/021
See application file for complete search history.

(56) References Cited

U.S. PATENT DOCUMENTS

| 5,485,904 A | 1/1996 | Organek et al. |
| 5,651,437 A * | 7/1997 | Organek ............... F16D 41/088 192/35 |
| 2010/0236888 A1 * | 9/2010 | Pritchard .............. F16D 27/115 192/35 |

FOREIGN PATENT DOCUMENTS

| DE | 100 57 098 C1 | 3/2002 | |
| DE | 10057098 C1 * | 3/2002 | .............. F01P 7/162 |

(Continued)

*Primary Examiner* — Charles Freay
*Assistant Examiner* — Kenneth J Hansen
(74) *Attorney, Agent, or Firm* — Norman B. Thot

(57) ABSTRACT

A coolant pump includes a rotatable rotor shaft, a pulley wheel which co-rotates with and is supported by the rotor shaft, a pump wheel rotatably supported at the rotor shaft, and an electrically switched wedge-coupled wet friction clutch. The wedge-coupled wet friction clutch comprises a clutch support fixed to the rotor shaft, a clutch ring arranged at a proximal side of the pump wheel, a clutch disk comprising a ferromagnetic element, a static electromagnet which axially pulls the clutch disk to the clutch support into a disengaged position when the static electromagnet is energized, and a wedge coupling mechanism. The wedge coupling mechanism comprises a wedge element and a counter-wedge element which are configured to generate an axial wedge force which axially pushes the clutch disk into an engaged position against the clutch ring when the static electromagnet is not energized and the rotor shaft rotates.

6 Claims, 3 Drawing Sheets

(56) References Cited

FOREIGN PATENT DOCUMENTS

| | | |
|---|---|---|
| EP | 0 669 480 A1 | 8/1995 |
| JP | 62-210287 A | 9/1987 |
| JP | 7-269592 A | 10/1995 |
| JP | 2010-127294 A | 6/2010 |

* cited by examiner

SWITCHABLE MECHANICAL COOLANT PUMP

CROSS REFERENCE TO PRIOR APPLICATIONS

This application is a U.S. National Phase application under 35 U.S.C. §371 of International Application No. PCT/EP2012/067740, filed on Sep. 11, 2012 and which claims benefit to European Patent Application No. 11007433.3, filed on Sep. 13, 2011. The International Application was published in English on Mar. 21, 2013 as WO 2013/037775 A1 under PCT Article 21(2).

FIELD

The present invention refers to a switchable mechanical coolant pump with a wet friction clutch actuated by an electromagnet.

BACKGROUND

The mechanical coolant pump is driven by an internal combustion engine for which the coolant pump generates a coolant flow. The coolant pump is provided with a pulley wheel which is driven by a drive belt. The switchable mechanical coolant pump is provided with a clutch arrangement that makes it possible to switch off the coolant pump if no active cooling of the engine is necessary, for example, right after a cold start of the engine.

The friction clutch can be a dry friction clutch which is exposed to the environment, can only be cooled by air, and increases the axial dimension of the dry part of the coolant pump. The friction clutch can alternatively be a wet friction clutch which has the disadvantage that the friction in the wet clutch environment is much lower than in a dry clutch environment. Much higher actuation power is therefore needed to engage the wet friction clutch. The wet friction clutch can, for example, be actuated by an electromagnetic arrangement which comprises an electromagnetic coil at one side and a ferromagnetic element at the other side. To provide high magnetic forces, expensive rare earth is needed for the ferromagnetic element.

SUMMARY

An aspect of the present invention is to provide a simple and cost-effective switchable mechanical coolant pump with a wet friction clutch.

In an embodiment, the present invention provides a switchable mechanical coolant pump for an engine which includes a rotor shaft configured to rotate, a pulley wheel configured to co-rotate with and be supported by the rotor shaft and to be directly drivable by the engine, a pump wheel configured to be rotatably supported at the rotor shaft, and a wedge-coupled wet friction clutch configured to be electrically switched. The wedge-coupled wet friction clutch comprises a clutch support fixed to the rotor shaft, a clutch ring arranged at a proximal side of the pump wheel, a clutch disk configured to be rotatably and shiftably supported by the rotor shaft, a static electromagnet configured to axially pull the clutch disk to the clutch support into a disengaged position when the static electromagnet is energized, and a wedge coupling mechanism defined at a proximal side of the clutch disk and at a distal side of the clutch support. The clutch disk comprises a ferromagnetic element and is arranged axially between the clutch support and the clutch ring. The wedge coupling mechanism comprises a wedge element arranged at the clutch disk or at the clutch support, and a counter-wedge element arranged at the clutch support or at the clutch disk. The wedge element and the counter-wedge element are configured to generate an axial wedge force which axially pushes the clutch disk into an engaged position against the clutch ring when the static electromagnet is not energized and the rotor shaft rotates.

BRIEF DESCRIPTION OF THE DRAWINGS

The present invention is described in greater detail below on the basis of embodiments and of the drawings in which.

DETAILED DESCRIPTION

Figure 1:
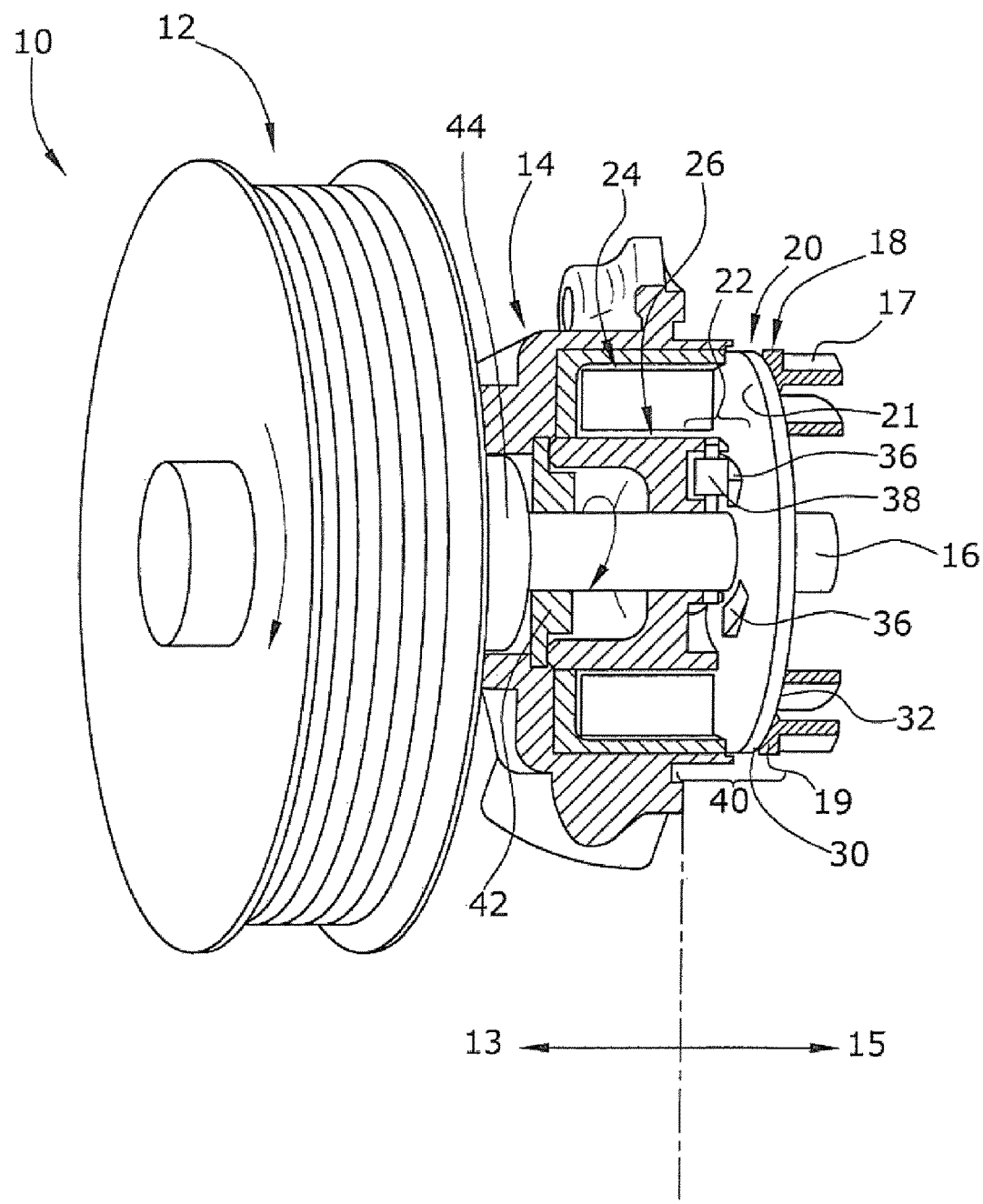
FIG. 1 shows an embodiment of the mechanical coolant pump with a wedge-coupling mechanism comprising an integral wedge ramp and a rolling element as a counter-wedge element.

The switchable mechanical coolant pump according to the present invention is provided with a pulley wheel which is fixed to one axial end of the rotatable rotor shaft so that the pulley wheel co-rotates with the rotor shaft. The pulley wheel can be directly driven by the combustion engine, for example, via a drive belt or via a gear arrangement. A pump wheel is rotatably supported at the other axial end of the rotor shaft so that the pump wheel is rotatable with respect to the rotor shaft but is not axially shiftable.

The coolant pump is provided with a wet friction clutch which is wedge-coupled and which is switched electrically by an electromagnetic actuator. The wet friction clutch comprises a clutch support being fixed to the rotor shaft in the wet pump section so that the clutch support co-rotates with the rotor shaft and is not shiftable. The clutch support serves as an axial support for the wedge-coupling mechanism.

A wet clutch ring is provided at the proximal side of the pump wheel, i.e., the side of the pump wheel which faces the dry side of the coolant pump. The clutch ring does not necessarily lie in a transversal plane, but is accessible from the distal side of the pump wheel.

A separate wet clutch disk which is rotatably and shiftably supported by the rotor shaft is provided. The clutch disk is arranged axially between the clutch support and the clutch ring. The clutch disk is provided with a clutch surface facing the clutch ring of the pump wheel so that the clutch disk and the clutch ring define a wet friction clutch in the wet pump sector. The clutch disk is provided with a ferromagnetic element so that the clutch disk can be attracted by an electromagnetic field. The ferromagnetic element can be a separate element at the clutch disk body, or the clutch disk body itself can be made of ferromagnetic material.

A static electromagnet is provided which is supported by and is fixed at a static pump housing or pump frame. The electromagnet is axially arranged as close as possible to the ferromagnetic element of the clutch disk. When the electromagnet is energized, i.e., activated, it axially attracts the clutch disk so that the clutch disk is pulled away from the pump wheel. The clutch defined by the pump wheel and the clutch disk is consequently disengaged when the electromagnet is activated.

The wet friction clutch further comprises a wedge-coupling mechanism defined at the distal side of the clutch disk and at the proximal side of the clutch support. The proximal side of the present pump is the side facing the pump wheel and the distal side is the side facing the pulley wheel. The wedge-coupling mechanism comprises a wedge element at the clutch disk or at the clutch support and a counter-wedge element at the clutch support or at the clutch disk. The wedge element and the counter-wedge element are axially opposed to each other so that they cooperate to generate an axial wedge force pushing the clutch disk axially into an engaged position against the clutch ring when the electromagnet is not energized and the rotor shaft rotates.

When the engine is running, the pulley wheel and the rotor shaft including the clutch support rotate with a rotational speed proportional to the engine's rotational speed. When the electromagnet is energized, the ferromagnetic element of the clutch disk and the clutch disk itself are axially attracted to the clutch support. Since the clutch disk and the clutch ring of the pump wheel are not engaged, no relevant torque is transmitted from the clutch disk to the pump wheel.

When the electromagnet is not energized, the rotation of the clutch disk is decelerated by the fluidic resistance generated by the rotating clutch disk surrounded by the coolant so that the clutch support and the clutch disk rotate with a different rotational speed. In other words, the clutch disk rotates with a differential speed with respect to the clutch support. The differential speed causes the wedge-coupling mechanism to generate an axial pushing force which pushes the clutch disk axially away from the clutch support so that the clutch disk is pushed against and thereby engaged with the clutch ring of the pump wheel. The pump wheel then rotates via the clutch disc, which is itself rotated by the wedge-coupling mechanism. The axial coupling force depends on the inclination or the leverage effect of the wedge element, and on the fluidic resistance of the rotating pump wheel and the clutch disk caused by the coolant. The higher the rotational speed of the pump wheel, the higher the fluidic resistance decelerating the pump wheel, so that the axial pushing force generated by the wedge-coupling mechanism is increased with increasing rotational speed.

The coupling force is not generated by the electromagnetic arrangement, so that the electromagnet and the corresponding ferromagnetic part can be dimensioned for a lower performance compared to conventional electromagnetic wet coupling arrangement. The coupling can also be realized as a wet coupling so that the axial dimension of the dry part of the coolant pump can be significantly reduced.

The axial magnetic force generated by the energized electromagnet and effecting the ferromagnetic element of the clutch disk acts to overpower the axial force generated by the wedge-coupling mechanism. If the electromagnetic arrangement is dimensioned to be very compact, so that the generated magnetic forces are relatively low, the clutch can only be disengaged at a low rotational speed or if the coolant pump stands still. This is not necessarily a disadvantage because the friction clutch needs to be disengaged, especially after a cold start of the engine, i.e., right after the coolant pump stood still or rotates at a very low rotational speed. If the electromagnet fails or the magnetic field generated by the electromagnet is too weak to pull the clutch disk into a disengaged position, the friction clutch cannot anymore be disengaged, but remains engaged. The coolant pump is consequently failsafe.

In an embodiment of the present invention, the wedge element can, for example, be an integral wedge ramp at the clutch disk or at the clutch support. The wedge ramp is mechanically simple and can be realized cost-effectively. The counter-wedge element can be realized as an opening, as a second wedge ramp oriented in opposite direction, or as a rolling element. An opening as the counter-wedge element is mechanically simple and can be mechanically sufficient if the axial coupling force is not too high. A second wedge ramp as the counter-wedge element is also mechanically relatively simple and reduces the danger of jamming. The rolling element as the counter-wedge element reduces friction significantly so that a reliable function of the engagement procedure and of the disengagement procedure can be provided for a long time. The rolling element can be a wheel, ball etc.

In an embodiment of the present invention, the wedge ramp can, for example, not be linear, but can follow a curve which is optimized for its function, especially in the initial and the final phase of the engagement movement and the disengagement movement, because the final phases are critical with respect to jamming. The inclination of the wedge ramp in the initial sector and in the final sector of the wedge ramp should therefore be adapted for high engagement and disengagement forces, respectively, to avoid jamming, especially in the initial disengagement or in the initial engagement phase.

In an embodiment of the present invention, the wedge element can, for example, not be realized as a kind of ramp, but can, for example, be realized as a lever, whereby the counter wedge element is a lever catch or a second lever hinge. The pivotal movement of the lever is restricted insofar as the lever cannot be pivoted completely into the transversal plane and cannot be pivoted into a completely axial position. The pivot range can, for example, be limited to a range of 10° to 80° relative to the transversal plane. When the engagement phase begins, the free end of the lever is engaged with the lever catch of the opposite part, for example, of the clutch disk. The lever is turned into a more axial position so that the clutch disk is pushed away and is moved into its engaged position against the backside of the pump wheel. The lever arrangement avoids any danger of jamming and is therefore very reliable.

Embodiments of the present invention are hereinafter described with reference to the drawings.

Figure 2:
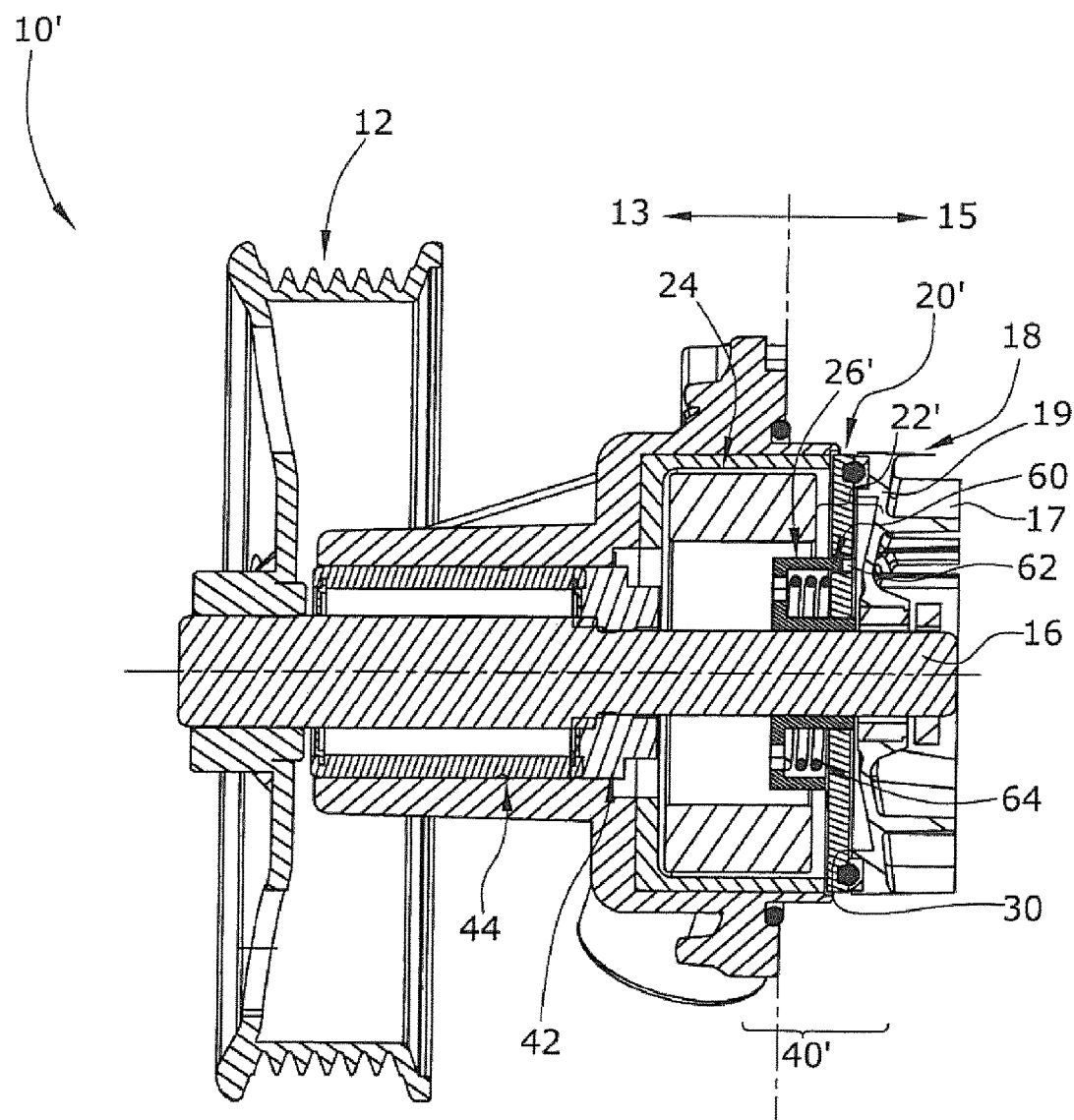
FIG. 2 shows an embodiment of the coolant pump with a wedge-coupling mechanism comprising an integral wedge ramp and a corresponding opening as a counter-wedge element.

FIGS. 1 and 2 show two embodiments of a switchable mechanical coolant pump 10;10' in a longitudinal cross section. The coolant pumps 10; 10' are suitable to be assembled to an internal combustion engine and to be driven by the internal combustion engine via a drive belt driving the pulley wheel 12. The coolant pump 10; 10' pumps a coolant in a coolant circuit for cooling the internal combustion engine.

The coolant pump 10; 10' is provided with a metal housing 14 which supports a bearing module 44. The bearing module 44 supports the rotatable rotor shaft 16 which is provided with the pulley wheel 12 co-rotating with the rotor shaft 16. The pulley wheel 12 and the rotor shaft 16 always rotate with a rotational speed which is proportional to the rotational speed of the driving engine. The pulley wheel 12 is provided at the distal end of the rotor shaft 16.

At the opposed proximal end of the rotor shaft 16, a pump wheel 18 is provided being rotatable but axially not shiftable with respect to the rotor shaft 16. The pump wheel 18 basically comprises a circular base plate 19 and pump blades 17 axially projecting from the base plate 19 in a proximal direction. The distal side of the pump wheel 18 is provided with a clutch ring 30 adjacent to the outer circumference of the base plate 19.

The rotor shaft 16 supports a clutch support 26 which is fixed to the rotor shaft 16 so that the clutch support 26 co-rotates with the rotor shaft 16. The clutch support 26 extends radially from the rotor shaft 16 and serves as an axial support for one side of a wedge-coupling mechanism 22;22'. The rotor shaft 16 finally supports a clutch disk 20 which is freely rotatable and shiftable with respect to the rotor shaft 16. The clutch disk 20 is provided with a friction surface at its proximal side, whereby the friction surface is adapted to cooperate with the clutch ring 30 of the pump wheel 18. The friction surface and the clutch ring 30 thereby define a frictional clutch surface pair. The base plate of the clutch disk 20 is made of ferromagnetic steel.

The housing 14 and a shaft seal 42 separate a dry section 13 from a wet section 15 of the coolant pump 10; 10'. The coolant is present in the wet section 15 and fills every gap. The housing 14 supports a static electromagnet 24 which is realized as a circular ring coil in the wet section 15 and radially surrounds the clutch support 26. The electromagnet 24 is controlled by an electronic cooling control module (not shown) and axially attracts the clutch disk 20 when the electromagnet 24 is energized with electric energy by the cooling control module.

The coolant pump 10;10' is provided with a wet friction clutch 40;40' which comprises the friction clutch surface pair, the electromagnet 24 and the wedge-coupling mechanism 22; 22'.

The wedge-coupling mechanism 22 of the embodiment of FIG. 1 comprises three wedge elements 36 (only two of which are shown in FIG. 1) realized as three integral wedge ramps at the distal side 21 of the clutch disk 20, and comprises three corresponding counter-wedge elements 38 (only one of which is shown in FIG. 1) realized as cylindrical rolling elements rotating around a radial rotation axis. The wedge elements 36 as well as the corresponding counter-wedge elements 38 are symmetrically arranged with an angular distance of 120° to each other. The wedge elements 36 are integral parts of the clutch disk 20 and are provided with a non-linear inclination with respect to the transversal plane. The local inclination of the wedge element 36 can be relatively low in the first section, relatively high in the middle section, and again relatively low in the end section. The effective axial height of the wedge elements 36 is higher than the maximum axial gap between the clutch disk 20 and the pump wheel 18 so that the clutch disk 20 can only be rotated in a range of 120° with respect to the pump wheel 18.

If the electromagnet 24 is not energized and the pulley wheel 12, the rotor shaft 16, and the clutch support 26, rotate with a rotational speed proportional to the engine's rotational speed, the clutch disk 20 is pulled by the wedge-coupling mechanism 22 with the same rotational speed, whereby rotation of the clutch disk 20 is slightly braked by the fluidic resistance of the clutch disk 20 rotating in the coolant. The slight braking of the clutch disk 20 with respect to the clutch support 26 causes the counter-wedge element 38 to engage the wedge element 36 so that the clutch disk 20 is axially pushed into the proximal direction towards the pump wheel 18 until the friction surfaces of the clutch disk 20 contact the pump wheel 18, thereby engaging the clutch disk 20. As soon as the clutch disk 20 is engaged, the pump wheel 18 co-rotates with the clutch disk 20, whereby a significant increase of the fluidic resistance is generated by the pump wheel 18 rotating in the coolant. The higher the fluidic resistance is, the higher is the axial coupling force generated by the wedge-coupling mechanism 22.

If the friction clutch 40 is disengaged, the electromagnet 24 is energized so that the ferromagnetic clutch disk 20 is attracted by the electromagnet 24 in axial distal direction. The axial magnetic force effecting the clutch disk 20 is so high that the axial proximal force generated by the wedge-coupling mechanism 22 can be overpowered at least at low rotational speeds. However, the magnetic force generated by the electromagnet 24 and the clutch disk 20 is at least high enough to attract the clutch disk 20 with a high reliability when the rotational speed of the rotor shaft 16 is zero so that the friction clutch 40 can be disengaged before the engine is started. When a cold engine is started, the warming process is shortened significantly if the coolant pump is switched off as long as the coolant does not have a working temperature. It can therefore be sufficient for most applications if the friction clutch 40 can only be disengaged reliably when the rotor shaft 16 is standing still.

In the embodiment of the coolant pump 10' shown in FIG. 2, the friction clutch 40', and in particular the wedge-coupling mechanism 22', is constructed simply and does not comprise a rolling element. The clutch support 26' is provided with three integrated wedge elements 60 (only one of which is shown in FIG. 2) formed as integral wedge ramps. The counter-wedge elements 62 (only one of which is shown in FIG. 2) are three corresponding circular openings in the clutch disk 20' so that the wedge elements 60 and the respective edges of the corresponding openings define the wedge-coupling mechanism 22'. The opening edges can be inclined or radiused to reduce friction. The clutch support 26' is provided with an axial preload spring 64 which pushes the clutch disk 20' into the engaged position. The preload spring 64 improves the liability of the clutch engagement, especially at low rotational speeds, and provides an automatic engagement of the frictional clutch when the rotor shaft 16 stands still.

Figure 3:
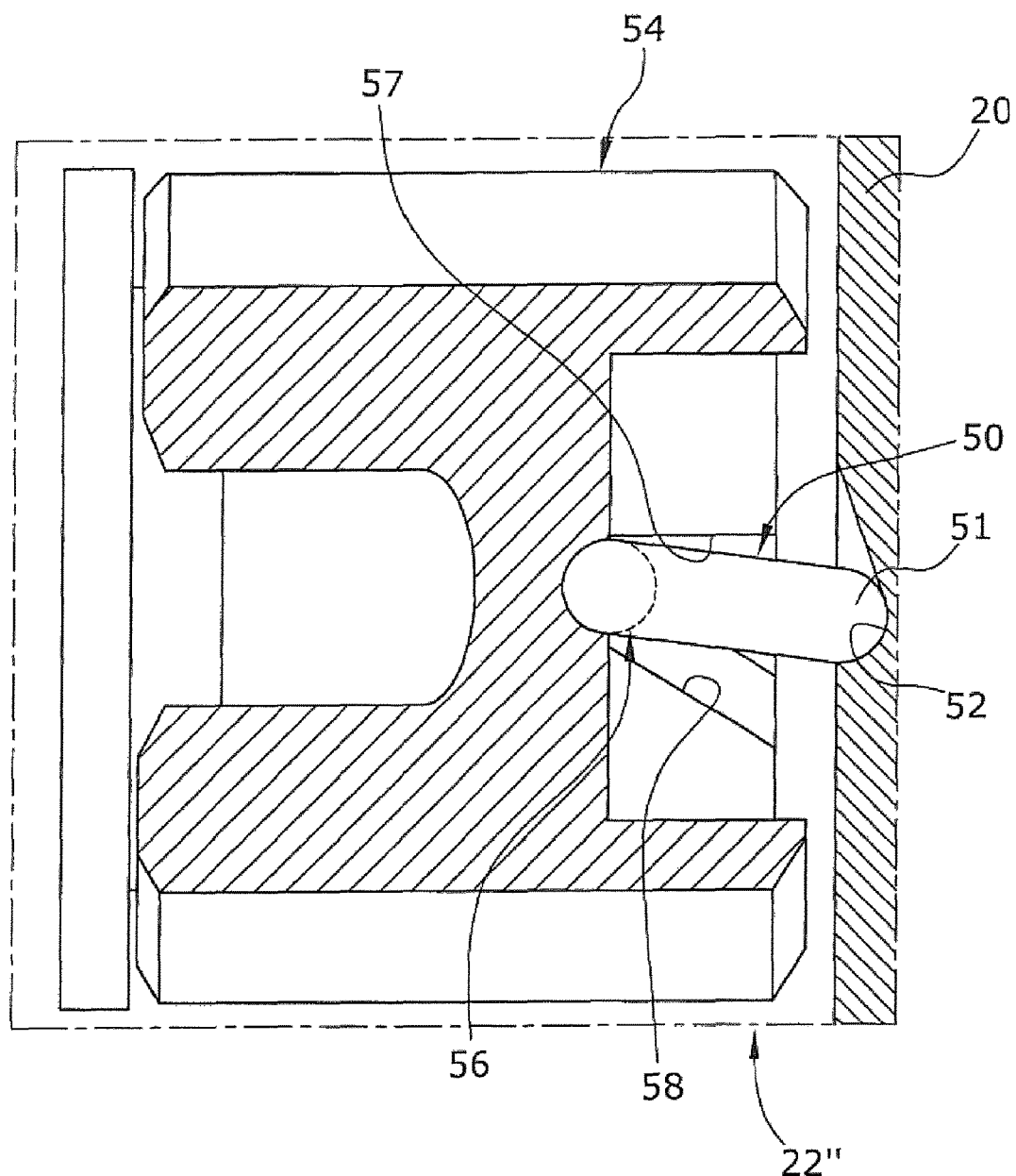
FIG. 3 shows a detail of an embodiment of the coolant pump with a wedge-coupling mechanism comprising a lever and a lever catch.

FIG. 3 shows another embodiment of the wedge-coupling mechanism 22", wherein the clutch support 54 is provided with three pivoting levers 50 (only one of which is shown in FIG. 3) defining the wedge elements which are supported at the clutch support 54 by respective hinges 56 (only one of which is shown in FIG. 3). The pivot range of each lever 50 is restricted by respective a lever stops 57,58 of the clutch support 54 to a range of 50° to 85° with respect to a transversal plane. The free proximal lever heads 51 of the levers 50 engage corresponding lever catches 52 which are formed as longitudinal abutments orientated in a circumferential direction in the clutch disk 20". When the electromagnet is not energized and the rotor shaft is rotating, the lever heads 51 glide into the corresponding lever catches 52 and are pivoted into a more axial orientation, thereby pushing the clutch disk 20" against the pump wheel. This wedge-coupling mechanism 22" provides high axial clutch engagement forces and relatively low actuation forces, and therefore provides high and long-term mechanical reliability.

The present invention is not limited to embodiments described herein; reference should be had to the appended claims.

What is claimed is:

1. A switchable mechanical coolant pump for an engine, the switchable mechanical coolant pump comprising:
   a rotor shaft configured to rotate;
   a pulley wheel configured to co-rotate with and be supported by the rotor shaft and to be directly drivable by the engine;

a pump wheel configured to be rotatably supported at the rotor shaft; and a wedge-coupled wet friction clutch configured to be electrically switched, the wedge-coupled wet friction clutch comprising:

a clutch support fixed to the rotor shaft in a wet pump section so that the clutch support co-rotates with the rotor shaft and is not shiftable, a clutch ring arranged at a proximal side of the pump wheel, a clutch disk configured to be rotatably and shiftably supported by the rotor shaft, the clutch disk comprising a ferromagnetic element and being arranged axially between the clutch support and the clutch ring, a static electromagnet configured to axially pull the clutch disk to the clutch support into a disengaged position when the static electromagnet is energized, and a wedge coupling mechanism defined at a proximal side of the clutch disk and at a distal side of the clutch support, the wedge coupling mechanism comprising:

a wedge element arranged at the clutch disk or at the clutch support, and a counter-wedge element arranged at the clutch support or at the clutch disk, wherein, the wedge element and the counter-wedge element are configured to generate an axial wedge force which axially pushes the clutch disk into an engaged position against the clutch ring when the static electromagnet is not energized and the rotor shaft rotates.

2. The switchable mechanical coolant pump as recited in claim 1, wherein the wedge element is provided as an integral wedge ramp.

3. The switchable mechanical coolant pump as recited in claim 2, wherein the integral wedge ramp is not linear.

4. The switchable mechanical coolant pump as recited in claim 1, wherein the counter wedge element is provided as a rolling element.

5. The switchable mechanical coolant pump as recited in claim 1, wherein the wedge element is provided as a lever and the counter-wedge element is provided as a lever catch or a lever hinge.

6. The switchable mechanical coolant pump as recited in claim 1, further comprising a preload spring which is configured to push the clutch disk into the engaged position.

\* \* \* \* \*